US012471126B2

(12) United States Patent
Choi et al.

(10) Patent No.: US 12,471,126 B2
(45) Date of Patent: Nov. 11, 2025

(54) ELECTRONIC DEVICE FOR CHANGING COMMUNICATION FREQUENCY ON BASIS OF DETECTION OF HIDDEN INTERFERENCE AND METHOD FOR OPERATING SAME

(71) Applicant: Samsung Electronics Co., Ltd., Suwon-si (KR)

(72) Inventors: Junsu Choi, Suwon-si (KR); Hyoseok Na, Suwon-si (KR); Janghyun Nam, Suwon-si (KR); Woosup Lee, Suwon-si (KR); Minsik Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 17/954,847

(22) Filed: Sep. 28, 2022

(65) Prior Publication Data

US 2023/0035273 A1 Feb. 2, 2023

Related U.S. Application Data

(63) Continuation of application No. PCT/KR2021/002973, filed on Mar. 10, 2021.

(30) Foreign Application Priority Data

Apr. 3, 2020 (KR) .................. 10-2020-0041034

(51) Int. Cl.
*H04W 72/541* (2023.01)
(52) U.S. Cl.
CPC ................ *H04W 72/541* (2023.01)
(58) Field of Classification Search
CPC ............ H04W 72/541; H04W 24/08; H04W 52/0216; H04W 52/0229; H04W 52/0241;
(Continued)

(56) References Cited

U.S. PATENT DOCUMENTS 10,567,047 B2  2/2020  Son et al.
10,701,730 B2  6/2020  Kim et al.
(Continued)

FOREIGN PATENT DOCUMENTS

CN  106576346 A  4/2017
CN  106612162 A  5/2017
(Continued)

OTHER PUBLICATIONS

Draft Standard for Information technology—Telecommunications and information exchange between systems Local and metropolitan area networks—Specific requirements, Prepared by the 802.11 Working Group of the LAN/MAN Standards Committee of the IEEE Computer Society, IEEE P802.11ax™/D6.0, Nov. 2019, (amendment to IEEE P802.11REVmd/D3.0).

(Continued)

*Primary Examiner* — Ayaz R Sheikh
*Assistant Examiner* — Mang Boi Thawng
(74) *Attorney, Agent, or Firm* — Jefferson IP Law, LLP

(57) ABSTRACT

An electronic device is provided. The electronic device includes a communication module, a processor operatively connected to the communication module, and a memory operatively connected to the processor, the memory include instructions that, when executed, cause the processor to receive a first signal by using a plurality of sub-frequency bands through the communication module, identify at least one sub-frequency band in which hidden interference is identified on the basis of a pre-high efficiency modulated field (pre-HE modulated field) of a packet indicated by the first signal, and change a communication frequency by transmitting a second signal including information indicating the at least one identified sub-frequency band to an external electronic device in which a wireless communication connection has been established.

20 Claims, 6 Drawing Sheets

(58) Field of Classification Search
CPC . H04W 76/16; H04W 88/06; H04W 72/0453; H04W 84/12; H04W 28/20; H04W 72/02
See application file for complete search history.

(56) References Cited

U.S. PATENT DOCUMENTS

| | | | |
|---|---|---|---|
| 11,671,137 | B2 | 6/2023 | Yang |
| 2016/0081087 | A1 | 3/2016 | Kwon |
| 2016/0242173 | A1* | 8/2016 | Li .................. H04B 7/0452 |
| 2016/0315741 | A1* | 10/2016 | Tsai .................. H04L 5/0058 |
| 2017/0264475 | A1 | 9/2017 | Son et al. |
| 2017/0289819 | A1 | 10/2017 | Kim et al. |
| 2017/0325178 | A1 | 11/2017 | Verma et al. |
| 2019/0007973 | A1 | 1/2019 | Lou et al. |
| 2019/0239232 | A1 | 8/2019 | Zhou et al. |
| 2020/0037342 | A1 | 1/2020 | Seok et al. |
| 2021/0153031 | A1* | 5/2021 | Sugaya ............ H04W 72/0453 |
| 2021/0328741 | A1 | 10/2021 | Jang et al. |
| 2022/0061051 | A1 | 2/2022 | Song et al. |
| 2023/0397178 | A1* | 12/2023 | Li .................. H04L 5/0007 |

FOREIGN PATENT DOCUMENTS

| | | |
|---|---|---|
| CN | 110140374 A | 8/2019 |
| EP | 2 620 017 B1 | 5/2018 |
| EP | 3 599 791 A1 | 1/2020 |
| JP | 2019-80250 A | 5/2019 |
| KR | 10-2019-0107599 A | 9/2019 |
| WO | 2016/195442 A1 | 12/2016 |
| WO | 2019/044486 A1 | 3/2019 |
| WO | 2020/045876 A1 | 3/2020 |
| WO | 2020/050541 A1 | 3/2020 |
| WO | 2020/060169 A1 | 3/2020 |
| WO | 2021/201456 A1 | 10/2021 |

OTHER PUBLICATIONS

Chong Han et al., Proposed LC PHY text for TGbb D0.1, IEEE 802.11-19/1820r2, IEEE P802.11bb, Wireless LANs, Nov. 12, 2019.
Extended European Search Report dated Aug. 24, 2023, issued in European Patent Application No. 21779899.0.
Chinese Office Action dated Feb. 28, 2025, issued in Chinese Application No. 202180032601.9.
Chinese Office Action dated Jul. 9, 2025, issued in Chinese Application No. 202180032601.9.
Korean Office Action dated Jul. 10, 2025, issued in Korean Application No. 10-2020-0041034.

* cited by examiner

ELECTRONIC DEVICE FOR CHANGING COMMUNICATION FREQUENCY ON BASIS OF DETECTION OF HIDDEN INTERFERENCE AND METHOD FOR OPERATING SAME

CROSS-REFERENCE TO RELATED APPLICATION(S)

This application is a continuation application, claiming priority under § 365(c), of an International application No. PCT/KR2021/002973, filed on Mar. 10, 2021, which is based on and claims the benefit of a Korean patent application number 10-2020-0041034, filed on Apr. 3, 2020, in the Korean Intellectual Property Office, the disclosure of which is incorporated by reference herein in its entirety.

BACKGROUND

1. Field

The disclosure relates to an electronic device for changing a communication frequency, based on the identifying of hidden interference, and a method for operating the same.

2. Description of Related Art

An electronic device and an access point may transmit and receive a signal, based on a specified radio access technology (RAT). When a wireless communication channel is established between the access point and a plurality of electronic devices, the access point may distribute frequency resources and time resources so that the plurality of electronic devices may perform wireless communication without interference.

As a method in which the access point and the plurality of electronic devices distribute frequency resources and time resources, there is a carrier sense multiple access with collision avoidance (CSMA/CA).

The above information is presented as background information only to assist with an understanding of the disclosure. No determination has been made, and no assertion is made, as to whether any of the above might be applicable as prior art with regard to the disclosure.

SUMMARY

An electronic device may receive a signal from another electronic device (e.g., another access point or a station) that uses the same frequency band according to a position. When an access point that has established a wireless communication channel with the electronic device is located at a distance of not detecting a signal from another electronic device, a corresponding frequency band may be recognized as not being occupied by another electronic device. In this case, the electronic device may experience hidden interference that the access point does not recognize.

Aspects of the disclosure are to address at least the above-mentioned problems and/or disadvantages and to provide at least the advantages described below. Accordingly, an aspect of the disclosure is to provide an electronic device for changing a communication frequency, based on the identifying of hidden interference, and a method for operating the same.

Technical problems to be achieved in the document are not limited to technical problems mentioned above, and other technical problems not mentioned above may be clearly understood by those having ordinary skill in the art to which the disclosure belongs from the description below.

Additional aspects will be set forth in part in the description which follows and, in part, will be apparent from the description, or may be learned by practice of the presented embodiments.

In accordance with an aspect of the disclosure, an electronic device is provided. The electronic device includes a communication module, a processor operatively connected to the communication module, and a memory operatively connected to the processor. The memory may include instructions that, when executed, cause the processor to receive a first signal by using a plurality of sub-frequency bands through the communication module, identify at least one sub-frequency band in which hidden interference is identified, based on a pre-high efficiency (pre-HE) modulated field of a packet indicated by the first signal, and change a communication frequency, by transmitting a second signal including information indicating the identified at least one sub-frequency band to an external electronic device in which a wireless communication connection has been established.

In accordance with another aspect of the disclosure, a method of operating an electronic device is provided. The method includes receiving a first signal by using a plurality of sub-frequency bands through a communication module of the electronic device, identifying at least one sub-frequency band in which hidden interference is identified, based on a pre-high efficiency (pre-HE) modulated field of a packet indicated by the first signal, and changing a communication frequency, by transmitting a second signal including information indicating the identified at least one sub-frequency band to an external electronic device in which a wireless communication connection has been established.

An electronic device of an embodiment and an operating method thereof may detect hidden interference, based on information on specified fields, and reduce the influence of the hidden interference.

An electronic device of an embodiment and an operating method thereof may forward information on hidden interference to an external electronic device (e.g., an access point or a station) by using a signal of a specified format.

An electronic device of an embodiment and an operating method thereof may improve the performance of wireless communication, by forwarding information on hidden interference to an external electronic device (e.g., an access point or a station) and stopping use of a frequency band in which the hidden interference exists.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
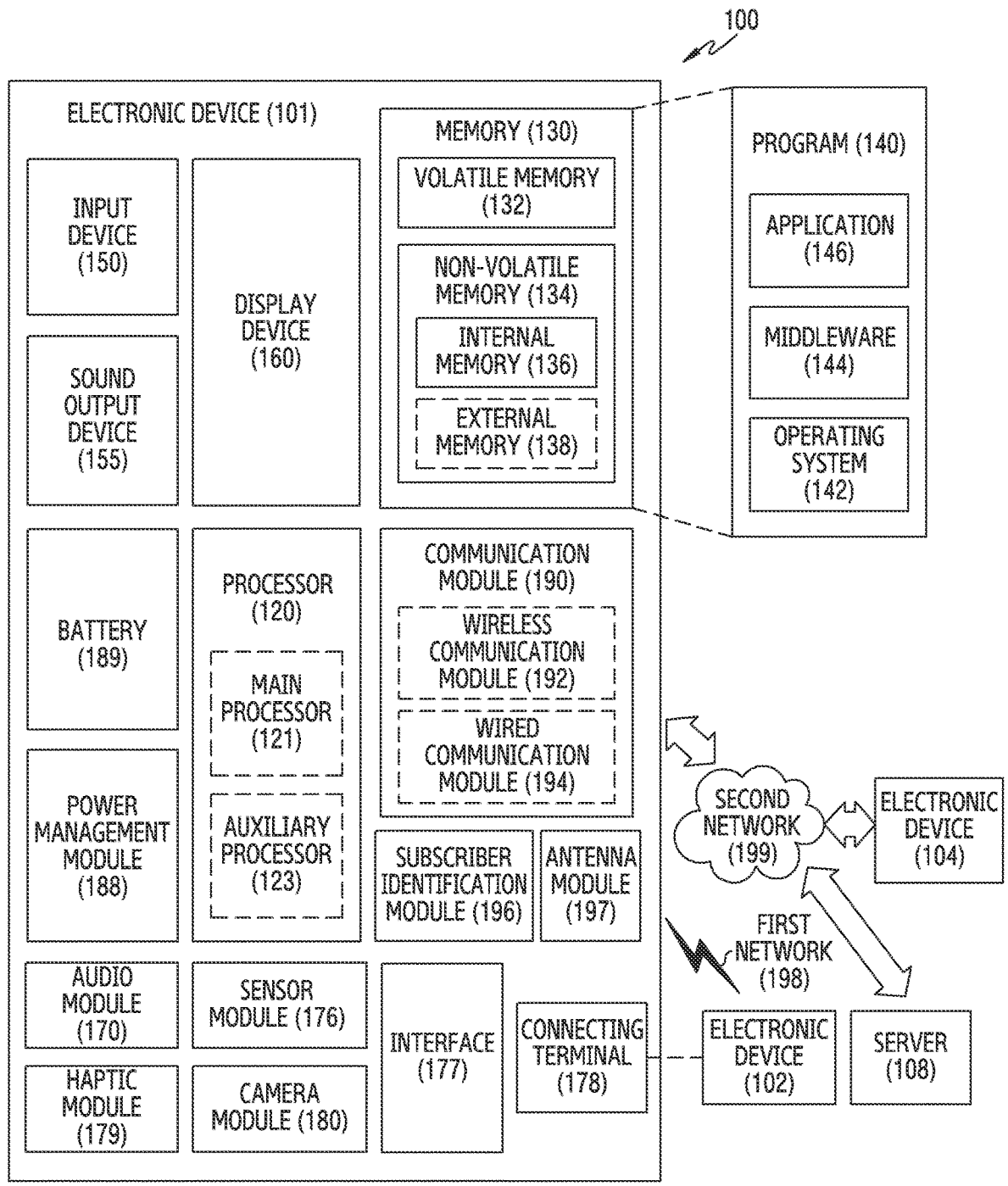
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
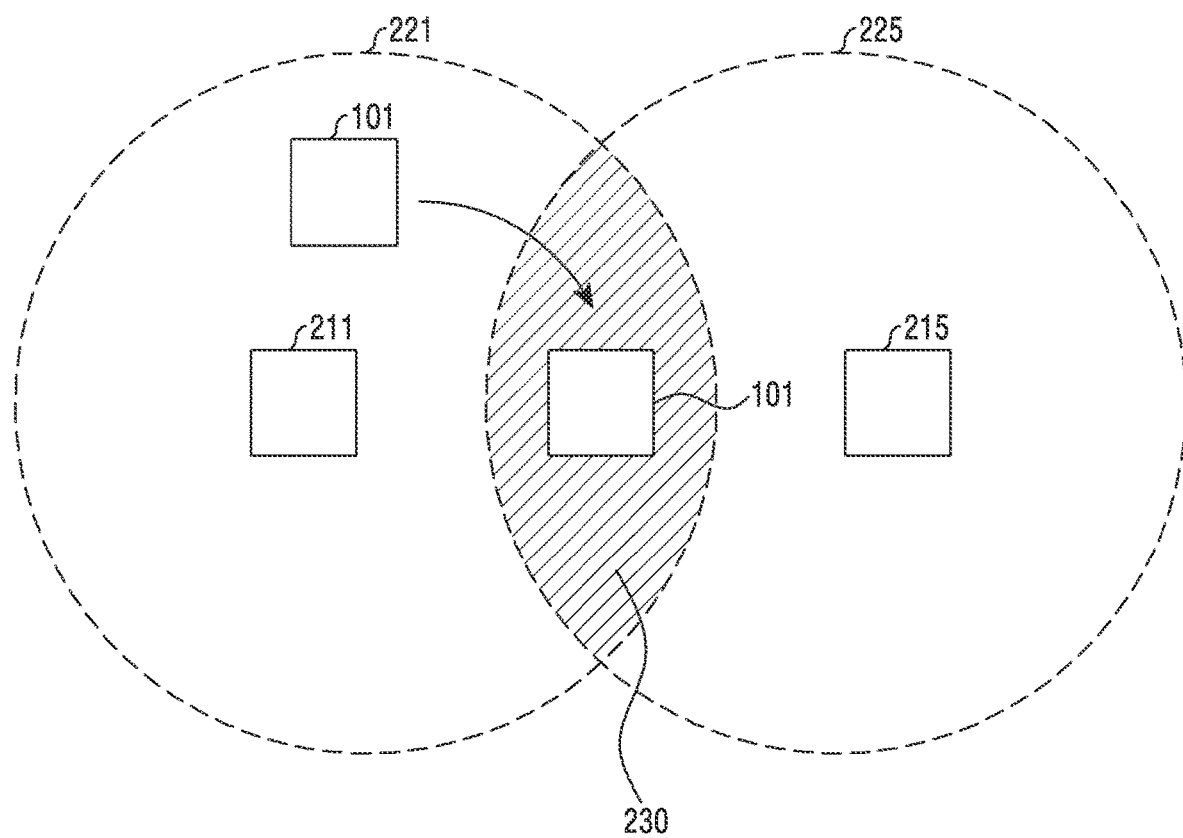
FIG. 2 is a diagram illustrating a situation in which an electronic device detects hidden interference and changes a communication frequency according to an embodiment of the disclosure.
Figure 3:
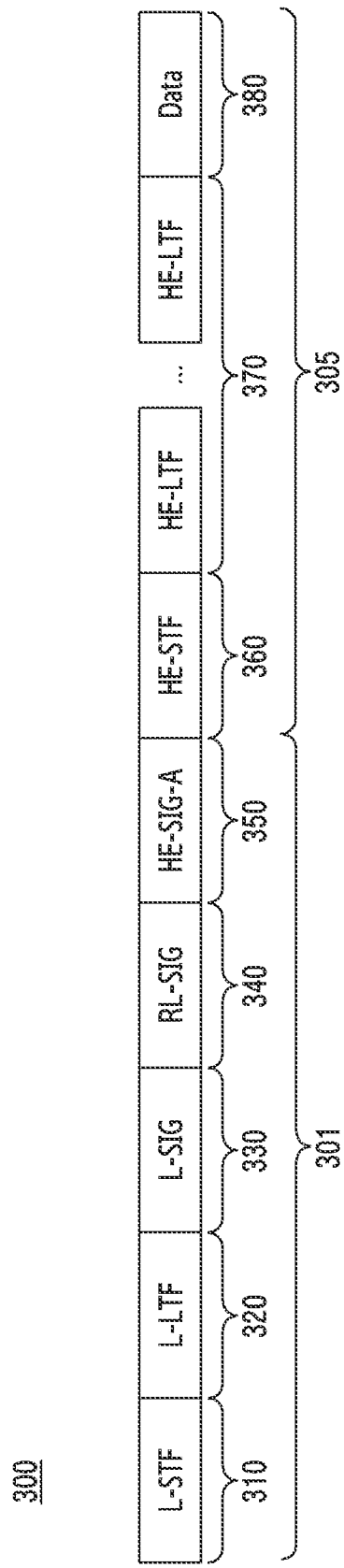
FIG. 3 is a diagram illustrating a data format according to an embodiment of the disclosure.
Figure 4:
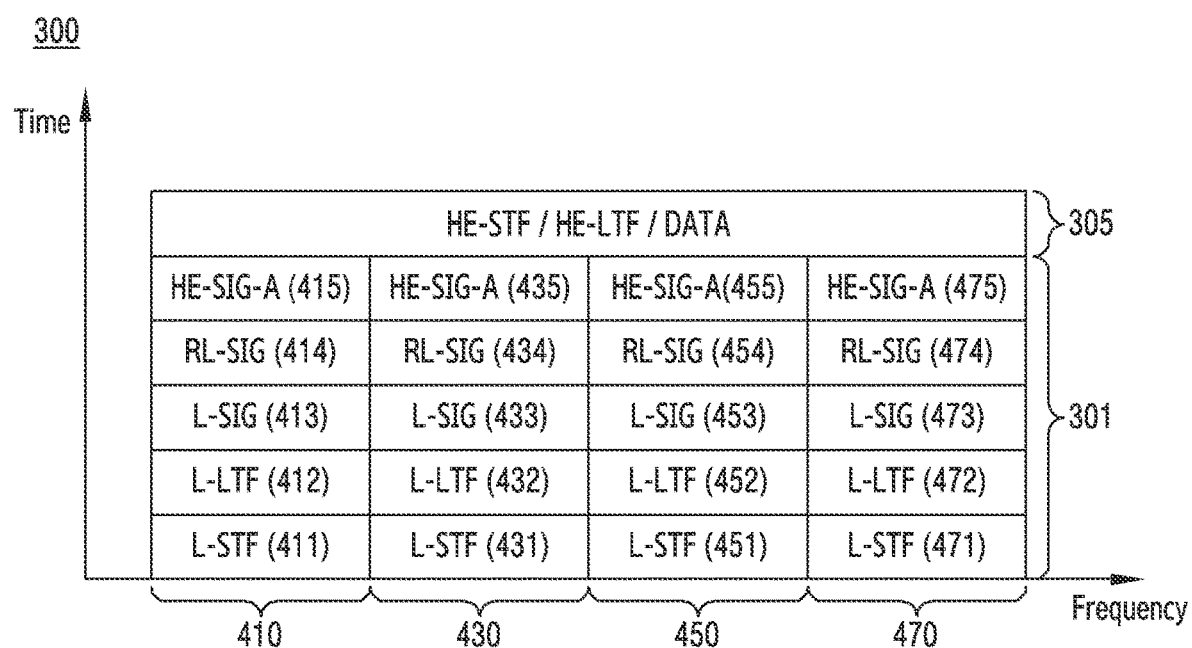
FIG. 4 is a diagram illustrating a data format in frequency and time axes according to an embodiment of the disclosure.

FIG. 2 is a diagram illustrating a situation in which an electronic device detects hidden interference and changes a communication frequency according to an embodiment of the disclosure. FIG. 3 is a diagram illustrating a data format according to an embodiment of the disclosure. FIG. 4 is a diagram illustrating a data format in frequency and time axes according to an embodiment of the disclosure. Referring to FIGS. 2, 3, and 4 may be described with reference to the construction of an electronic device of FIG. 1.

Referring to FIG. 2, in an embodiment, while a wireless communication channel is established with an external electronic device 211 (e.g., the electronic device 102 of FIG. 1), the electronic device 101 may move from a service area 221 of the external electronic device 211 to an area 230 where hidden interference by another external electronic device 215 (e.g., the electronic device 102 of FIG. 1) occurs. In an embodiment, the area 230 in which the hidden interference occurs may be an area in which the service area 221 of the external electronic device 211 and a service area 225 of another external electronic device 215 are overlapped with each other. In an embodiment, the external electronic device 211 may be an access point (AP) and/or a station. In an embodiment, another external electronic device 215 may be a device that performs wireless communication that is based on a frequency band that at least partially overlaps with a frequency band used in the wireless communication channel between the electronic device 101 and the external electronic device 211. Since the external electronic device 211 is not located in the service area 225 of another external electronic device 215, the external electronic device 211 does not receive a signal transmitted by another external electronic device 215, and thus may not know the existence of another external electronic device 215. In this case, collision may occur in some frequency bands overlapping with a frequency band used by another external electronic device 215, among frequency bands used by the external electronic device 211.

In an embodiment, when the electronic device 101 identifies hidden interference while a wireless communication channel is established with the external electronic device 211, the electronic device 101 may send a request for changing a frequency band of the wireless communication channel to the external electronic device 211. In an embodiment, the electronic device 101 may transmit, to the external electronic device 211, a signal indicating information on some frequency bands in which hidden interference is identified among frequency bands used in the wireless communication channel.

Hereinafter, an operation in which the electronic device 101 detects hidden interference and changes a communication frequency will be described with reference to the construction of the electronic device 101 of FIG. 1.

In an embodiment, the processor 120 of the electronic device 101 may establish a wireless communication channel with the external electronic device 211 through the wireless communication module 192 of the electronic device 101. In an embodiment, the processor 120 may establish the wireless communication channel with the external electronic device 211 through the wireless communication module 192, based on a specified radio access technology (RAT). In an embodiment, the specified RAT may include a RAT that is based on the Institute of Electrical and Electronics Engineers (IEEE) 802.11 standard (e.g., the IEEE 802.11ax standard).

In an embodiment, the processor 120 may transmit or receive a signal through the wireless communication module 192, based on a frequency band allocated to the wireless communication channel established with the external electronic device 211. In an embodiment, the processor 120 may transmit or receive a signal to or from the external electronic device 211 through the wireless communication module 192, based on a plurality of sub-frequency bands included in the allocated frequency band. In an embodiment, the frequency band allocated to the wireless communication channel may include at least one sub-frequency band. In an embodiment, the sub-frequency band may have a specified bandwidth (e.g., 20 megahertz (MHz)). In an embodiment, when the frequency band allocated to the wireless communication channel has a bandwidth of 20 MHz, there may be one sub-frequency band. In an embodiment, when the frequency band allocated to the wireless communication channel has a bandwidth of 160 MHz, there may be eight sub-frequency bands.

In an embodiment, when the specified RAT is based on the IEEE 802.11ax standard, a signal received based on the frequency band allocated to the wireless communication module 192 may have a data format 300 illustrated in FIGS. 3 and 4. In an embodiment, the data format 300 may correspond to a high efficiency (HE) physical protocol data unit (PPDU).

Referring to FIG. 3, in an embodiment, the data format 300 may include a pre-HE modulated field 301 and an HE modulated field 305. In an embodiment, the pre-HE modulated field 301 may include a non-high-throughput (HT) short training field (L-STF) 310, a non-HT long training field (L-LTF) 320, a non-HT signal field (L-SIG) 330, a repeated non-HT signal field (RL-SIG) 340, an HE signal A (HE-SIG-A) field 350, or a combination thereof. In an embodiment, the HE modulated field 305 may further include an HE short training field (HE-STF) 360, at least one or more HE long training field (HE-LTF) 370, a data field 380, or a combination thereof. In an embodiment, in the data format 300, some fields may be omitted, or other fields (e.g., an HE signal B (HE-SIG-B) field or a packet extension (PE) field) may be further added.

In an embodiment, each of the fields 310 to 350 included in the pre-HE modulated field 301 may be repeatedly transmitted for each sub-frequency band. For example, referring to FIG. 4, when a frequency band allocated to a wireless communication channel includes four sub-frequency bands 410, 430, 450, and 470, a signal received by the wireless communication module 192 may include the same four pre-HE modulated fields 301. For example, information included in each of an L-STF 411, an L-LTF 412, an L-SIG field 413, an RL-SIG field 414, or an HE-SIG-A field 415 included in the pre-HE modulated field 301 of the sub-frequency band 410 may be the same as information included in each of an L-STF 431, 451, or 471, an L-LTF 432, 452, or 472, an L-SIG field 433, 453, or 473, an RL-SIG field 434, 454, or 474, or an HE-SIG-A field 435, 455, or 475.

In an embodiment, the L-STF 310 may include a short training orthogonal frequency division multiplexing (OFDM) symbol. In an embodiment, the L-STF 310 may be used for frame timing acquisition, automatic gain control (AGC), diversity detection, coarse frequency/time synchronization, or a combination thereof.

In an embodiment, the L-LTF 320 may include a long training OFDM symbol. In an embodiment, the L-LTF 320 may be used for fine frequency/time synchronization, channel estimation, or a combination thereof.

In an embodiment, the L-SIG field 330 may be used to transmit control information for demodulation and decoding of a data field. In an embodiment, the L-SIG field 330 may include information on a data rate, a data length, or a combination thereof.

In an embodiment, the RL-SIG field 340 may be a field that repeats the L-SIG field 330. In an embodiment, the RL-SIG field 340 may be used to distinguish between PPDUs. In an embodiment, the RL-SIG field 340 may be used to distinguish between an HE PPDU, a non-HT PPDU, an HT PPDU, or a very high throughput (VHT) PPDU.

In an embodiment, the HE-SIG-A field 350 may include information necessary to interpret the HE PPDU. In an embodiment, the HE-SIG-A field 350 may include common control information commonly transmitted to devices (e.g., the electronic device 101) receiving the PPDU. In an embodiment, the HE-SIG-A field 350 may at least include bandwidth information, group identifier information (e.g., a basic service set (BSS) color), and a link indicator (e.g., information indicating uplink or downlink). In an embodiment, the BSS color may indicate information for identifying a BSS.

In an embodiment, the HE-STF 360 may be a field for improving the estimation of automatic gain control in multiple inputs and multiple outputs (MIMO) transmission.

In an embodiment, the HE-LTF 370 may be used to allow devices (e.g., the electronic device 101) receiving a signal to estimate a MIMO channel between reception chains and a set of constellation mapper outputs. In an embodiment, the HE modulated field 305 may include one or more HE-LTFs 370.

In an embodiment, the processor 120 may receive, through the wireless communication module 192, a signal corresponding to the data format 300 through at least one of the sub-frequency bands 410, 430, 450, or 470. In an embodiment, the processor 120 may receive the pre-HE modulated field 301 through at least one of the sub-frequency bands 410, 430, 450, or 470 through the wireless communication module 192. In an embodiment, the processor 120 may receive the HE-SIG-A field 350 through at least one of the sub-frequency bands 410, 430, 450, or 470 through the wireless communication module 192.

In an embodiment, the processor 120 may identify information from a signal received through at least one sub-frequency band. In an embodiment, the processor 120 may identify information in the pre-HE modulated field 301 of the signal received through the at least one sub-frequency band. In an embodiment, the processor 120 may identify information in the HE-SIG-A field 350 of the signal received through the at least one sub-frequency band. In an embodiment, the identified information may include bandwidth information, BSS identification information, a link indicator, or a combination thereof.

In an embodiment, the processor 120 may identify whether information identified in the HE-SIG-A field 350 of the signal received through the at least one sub-frequency band includes specified information. For example, the processor 120 may identify whether the information identified in the HE-SIG-A field 435 of the signal received through the sub-frequency band 430 includes the specified information. In an embodiment, the specified information may include identification information (e.g., a BSS color) of a BSS related to the external electronic device 211, and a link indicator indicating a downlink.

In an embodiment, the processor 120 may identify whether the information identified in the HE-SIG-A field 350 received through the at least one sub-frequency band indicates identification information (e.g., a BSS color) of a BSS related to the external electronic device 211. In an embodiment, the processor 120 may identify whether the information identified in the HE-SIG-A field 350 received through the at least one sub-frequency band indicates a downlink (e.g., a link in which the external electronic device 211 transmits data to the electronic device 101).

In an embodiment, when the information identified in the HE-SIG-A field 350 received through at least one sub-frequency band indicates the identification information of a BSS related to the external electronic device 211 and the downlink, the processor 120 may identify at least one sub-frequency band (e.g., a sub-frequency band 410) not receiving the pre-HE modulated field 301, among the sub-frequency bands 410, 430, 450, or 470. In an embodiment, the processor 120 may identify a sub-frequency band receiving the HE-SIG-A field 350 in which the specified information is not identified, among the sub-frequency bands 410, 430, 450, or 470, as a sub-frequency band not receiving the pre-HE modulated field 301.

In an embodiment, the processor 120 may identify at least one sub-frequency band (e.g., the sub-frequency band 410) not receiving the pre-HE modulated field 301, as a sub-frequency band in which hidden interference exists. In an embodiment, the processor 120 may identify a sub-frequency band receiving the HE-SIG-A field 350 in which the specified information is not identified, among the sub-frequency bands 410, 430, 450, or 470, as the sub-frequency band in which the hidden interference exists.

In an embodiment, the processor 120 may identify a sub-frequency band receiving the HE-SIG-A field 350 in which identification information (e.g., a BSS color) of a BSS related to the external electronic device 211 among specified information is not identified, as a sub-frequency band in which hidden interference exists. For example, when the identification information (e.g., the BSS color) of the BSS related to the external electronic device 211 is not identified in the HE-SIG-A field 415 received through the sub-frequency band 410, the processor 120 may identify the sub-frequency band 410 as the sub-frequency band in which the hidden interference exists. For another example, when identification information (e.g., a BSS color) of a BSS related to another external electronic device 215 is identified in the HE-SIG-A field 415 received through the sub-frequency band 410, the processor 120 may identify the sub-frequency band 410 as the sub-frequency band in which the hidden interference exists.

In an embodiment, the processor 120 may identify a sub-frequency band receiving the HE-SIG-A field 350 in which the indicator indicating the downlink among the specified information is not identified, as a sub-frequency band in which hidden interference exists. For example, when the indicator indicating the downlink is not identified in the HE-SIG-A field 415 received through the sub-frequency band 410, the processor 120 may identify the sub-frequency band 410 as the sub-frequency band in which the hidden interference exists. For another example, when the indicator indicating the uplink is identified in the HE-SIG-A field 415 received through the sub-frequency band 410, the processor 120 may identify the sub-frequency band 410 as the sub-frequency band in which the hidden interference exists.

In an embodiment, the processor 120 may identify a sub-frequency band receiving the pre-HE modulated field 301 in which a specified number or more of information different from information of the pre-HE modulated field 301 of a sub-frequency band in which the specified information is identified are identified, as a sub-frequency band in which hidden interference exists. For example, when the specified information is identified in the HE-SIG-A field 415 of the pre-HE modulated field 301 received through the sub-frequency band 430, the processor 120 may identify the sub-frequency band 410 receiving the pre-HE modulated field 301 in which a specified number or more of information different from information of the pre-HE modulated field 301 received through the sub-frequency band 430 are identified, as a sub-frequency band in which hidden interference exists.

In an embodiment, the processor 120 may identify a sub-frequency band receiving the pre-HE modulated field 301 in which the same information is not identified, as a sub-frequency band in which hidden interference exists. For example, when information indicated by the pre-HE modulated field 301 received through a relatively small number of sub-frequency bands is different from a specified number or more of information indicated by the pre-HE modulated field 301 received through a relatively large number of sub-frequency bands, the processor 120 may identify the relatively small number of sub-frequency bands, as the sub-frequency band in which the hidden interference exists. For example, when the information indicated by the pre-HE modulated field 301 received through the sub-frequency band 410 is different from a specified number or more of information indicated by the pre-HE modulated field received through the other sub-frequency bands 430, 450, or 470, the processor 120 may identify the sub-frequency band 410 as the sub-frequency band in which the hidden interference exists.

In an embodiment, the processor 120 may request to change a frequency band allocated to a wireless communication channel established with the external electronic device 211, based on information on at least one sub-frequency band (e.g., the sub-frequency band 410) in which hidden interference exists.

In an embodiment, the processor 120 may determine whether it is necessary to change the frequency band allocated to the wireless communication channel established with the external electronic device 211, based on the number of times of identifying hidden interference in each of the at least one sub-frequency band 410, 430, 450, or 470 included in the allocated frequency band. In an embodiment, the processor 120 may determine whether it is necessary to change the frequency band allocated to the wireless communication channel established with the external electronic device 211, based on the number of times of identifying hidden interference per unit time (e.g., 1 second) in each of the at least one sub-frequency bands 410, 430, 450, or 470 included in the allocated frequency band.

In an embodiment, when the number of times of identifying hidden interference in each of the at least one sub-frequency band 410, 430, 450, or 470 included in the allocated frequency band exceeds a specified threshold number of times, the processor 120 may determine that it is necessary to change the frequency band allocated to the wireless communication channel established with the external electronic device 211. In an embodiment, the specified threshold number of times may be set differently for each application 146 (or a function presented by the application 146) of the electronic device 101 that is being executed. In an embodiment, the application 146 of the electronic device 101 that is being executed may be a destination of a signal received through the wireless communication channel. In an embodiment, the application 146 of the electronic device 101 that is being executed may be an application that is currently transmitting and receiving data with the external electronic device 211 through the wireless communication channel. For example, the specified threshold number of times may be set differently for each application (or service type) as shown in Table 1 below.

TABLE 1

| Applications | VoIP | Video Streaming | Web Browsing |
| --- | --- | --- | --- |
| Threshold number of times | 5 | 10 | 20 |

Referring to Table 1, when the application 146 transmits/receives data to and from the external electronic device 211 through voice over Internet protocol (VoIP), the threshold number of times may be 5. Referring to Table 1, when the application 146 is under video streaming, the threshold number of times may be 10. Referring to Table 1, when the application 146 is under web browsing, the threshold number of times may be 20. For example, when the number of times of identifying hidden interference per unit time (e.g., 1 second) in each of the sub-frequency bands 410, 430, 450, or 470 included in the allocated frequency band is 15, 0, 0, or 0, the processor 120 may determine whether it is necessary to change the frequency band allocated to the wireless communication channel established with the external electronic device 211 according to a function presented by the application 146 of the electronic device 101 that is being executed. For example, when the function presented by the application 146 of the electronic device 101 that is being executed is VoIP or video streaming, the processor 120 may determine that it is necessary to change a frequency band of the sub-frequency band 410 in which hidden interference exceeding the threshold number of times (e.g., 5 or 10) is identified. For another example, when the function presented by the application 146 of the electronic device 101 that is being executed is web browsing, the processor 120 may determine that it is not necessary to change a frequency band of the sub-frequency bands 410, 430, 450, or 470, since each of the sub-frequency bands 410, 430, 450, or 470 does not exceed the number of times (e.g., 20).

In an embodiment, the processor 120 may request a change of the frequency band allocated to the wireless communication channel, by transmitting a signal indicating a packet including information on at least one sub-frequency band (e.g., the sub-frequency band 410) in which the hidden interference exists to the external electronic device 211.

In an embodiment, the packet including the information on the at least one sub-frequency band in which the hidden interference exists may be a packet including a target wake time (TWT) element. In an embodiment, the TWT element may be an element used to negotiate a time during which a station (e.g., the electronic device 101) may transmit a packet to an access point (e.g., the external electronic device 211). In an embodiment, the TWT element may be defined as shown in Table 2 below.

TABLE 2

| Field Name | Element ID | Length | Control | Parameter Information |
|---|---|---|---|---|
| Byte | 1 | 1 | 1 | Variable |

In an embodiment, the processor 120 may provide the TWT element including the information on the at least one sub-frequency band (e.g., the sub-frequency band 410) in which the hidden interference exists, in a TWT parameter information field. In an embodiment, the TWT parameter information field may be defined as shown in Table 3 below.

TABLE 3

| Field Name | Request Type | Target Wake Time | TWT Group Assignment | Nominal Minimum TWT Wake Duration | TWT Wake Interval Mantissa | TWT Channel | NDP Paging (option) |
|---|---|---|---|---|---|---|---|
| Byte | 2 | 0 or 8 | 0, 3, or 9 | 1 | 2 | 1 | 0 or 4 |

In an embodiment, the processor 120 may provide the TWT element including the information on the at least one sub-frequency band (e.g., the sub-frequency band 410) in which the hidden interference exists, in the TWT channel field of the TWT parameter information field. For example, when the frequency band allocated to the wireless communication channel includes four sub-frequency bands 410, 430, 450, or 470, and a sub-frequency band in which hidden interference exists is the sub-frequency band 410, the TWT channel field may be composed of bit sequences as shown in Table 4 below.

TABLE 4

| order | 1 | 2 | 3 | 4 | 5 | 6 | 7 | 8 |
|---|---|---|---|---|---|---|---|---|
| bit value | 0 | 1 | 1 | 1 | 1 | 1 | 1 | 1 |

Referring to Table 4, first to fourth bits may indicate the presence or absence of hidden interference of each of the sub-frequency bands 410, 430, 450, and 470. Referring to Table 4, the first bit may indicate that hidden interference exists in the sub-frequency band 410. Referring to Table 4, the second to fourth bits may indicate that hidden interference does not exist in each of the sub-frequency bands 410, 430, 450, and 470. Referring to Table 4, the fifth to eighth bits may indicate sub-frequency bands not allocated to a wireless communication channel. In an embodiment, the fifth to eighth bits may have a value of 0 or 1, according to a channel environment (e.g., presence or absence of hidden interference) of the sub-frequency band indicated by the corresponding bits. In an embodiment, the processor 120 may request a change of a frequency band allocated to the wireless communication channel, by transmitting a signal including the provided TWT element to the external electronic device 211.

In an embodiment, a packet including information on at least one sub-frequency band in which hidden interference exists may be transmitted through a packet having a format for indicating a bandwidth query report (BQR). In an embodiment, the packet having the format for indicating the BQR may be provided for a response to a BQP poll (BQRP) transmitted by an access point (e.g., the external electronic device 211) to a station (e.g., the electronic device 101) in order to identify a frequency band of an idle state at a specific time point. In an embodiment, the packet of the format for indicating the BQR may be defined as shown in Table 5 below.

TABLE 5

| Field Name | Available Channel Bitmap | Reserved |
|---|---|---|
| bit | 8 | 2 |

In an embodiment, in response to receiving the BQRP from the external electronic device 211, the processor 120 may provide a packet having a format for indicating a BQR including information on at least one sub-frequency band (e.g., the sub-frequency bands 410) in which the hidden interference exists, in an available channel bitmap field. In an embodiment, the processor 120 may request a change of a frequency band allocated to a wireless communication channel, by transmitting a signal indicating the provided packet having the format for indicating the BQR to the external electronic device 211. In an embodiment, the external electronic device 211 may change the frequency band allocated to the wireless communication channel with the electronic device 101, based on the signal received from the electronic device 101. In an embodiment, the signal received by the external electronic device 211 from the electronic device 101 may include information on at least one sub-frequency band (e.g., the sub-frequency band 410) in which the hidden interference exists. In an embodiment, the signal received by the external electronic device 211 from the electronic device 101 may include bit sequences of a specified length (e.g., 8). In an embodiment, each of the bit sequences may indicate the presence or absence of hidden interference of each of sub-frequency bands included in a frequency band. For example, when the frequency band includes four sub-frequency bands 410, 430, 450, or 470, and the signal received from the electronic device 101 includes 8-bit bit sequences (e.g., 01111111), the first bit (e.g., 0) of the bit sequences (e.g., 01111111) may indicate that hidden interference exists in the first sub-frequency band (e.g., the sub-frequency band 410) among the sub-frequency bands included in the frequency band. For example, the second to fourth bits (e.g., 111) of the bit sequences (e.g., 01111111) may indicate that hidden interference does not exist in the second to fourth sub-frequency bands 430, 450, and 470 among the sub-frequency bands included in the frequency band. For example, the fifth to eighth bits (e.g., 1111) of the bit sequences (e.g., 01111111) may indicate a channel environment (e.g., presence or absence of hidden interference) of sub-frequency bands not allocated to the wireless communication channel. For example, when the bit indicating the channel environment of the sub-frequency band not allocated to the wireless communication channel is 1, it may indicate that the corresponding sub-frequency band is not occupied by another electronic device (e.g., the electronic device 215).

For another example, when the frequency band allocated to the wireless communication channel includes one sub-frequency band, and the signal received from the electronic device 101 includes 8-bit bit sequences (e.g., 01111111), the first bit (e.g., 0) of the bit sequences (e.g., 01111111) may indicate that hidden interference exists in the first sub-frequency band included in the frequency band. For example, the second to eighth bits (e.g., 1111111) of the bit sequences (e.g., 01111111) may indicate a channel environment (e.g., presence or absence of hidden interference) of sub-frequency bands not allocated to the wireless communication channel.

For further example, when the frequency band allocated to the wireless communication channel includes 8 sub-frequency bands, and the signal received from the electronic device 101 includes 8-bit bit sequences (e.g., 01111111), the first bit (e.g., 0) of the bit sequences (e.g., 01111111) may indicate that hidden interference exists in the first sub-frequency band among sub-frequency bands included in the frequency band. For example, the second to eighth bits (e.g., 1111111) of the bit sequences (e.g., 01111111) may indicate that hidden interference does not exist in the second to eighth sub-frequency bands among the sub-frequency bands included in the frequency band.

In an embodiment, the external electronic device 211 may change a frequency band, by setting not to use a sub-frequency band (e.g., the sub-frequency band 410) in which the hidden interference exists, for communication with the electronic device 101. In an embodiment, the external electronic device 211 may change the frequency band, by setting to use sub-frequency bands (e.g., the sub-frequency bands 430, 450, and 470) in which hidden interference does not exist, for communication with the electronic device 101.

In an embodiment, the external electronic device 211 may change the frequency band, by again setting the frequency band used for communication with the electronic device 101 in response to a request for changing the frequency band allocated to the wireless communication channel. In an embodiment, in response to the request for changing the frequency band allocated to the wireless communication channel, when the number of sub-frequency bands in which hidden interference exists is greater than or is equal to a specified number, the external electronic device 211 may change the frequency band, by again setting the frequency band used for communication with the electronic device 101. For example, the external electronic device 211 may establish the wireless communication channel through a frequency band (e.g., 6.100 to 6.260 GHz) that is distinguished from a frequency band (e.g., 5.940 to 6.100 GHz) used for communication with the electronic device 101.

In an embodiment, in response to a request for changing a frequency band allocated to the wireless communication channel, the external electronic device 211 may change the frequency band, by additionally setting the frequency band used for communication with the electronic device 101. In an embodiment, in response to the request for changing the frequency band allocated to the wireless communication channel, the external electronic device 211 may change the frequency band, by additionally setting the frequency band used for communication with the electronic device 101, based on a bit indicating a channel environment of a sub-frequency band not allocated to the wireless communication channel. In an embodiment, in response to the request for changing the frequency band allocated to the wireless communication channel, the external electronic device 211 may change the frequency band, by additionally setting frequency bands adjacent to the frequency band used for communication with the electronic device 101. In an embodiment, in response to the request for changing the frequency band allocated to the wireless communication channel, the external electronic device 211 may change the frequency band, by additionally setting frequency bands apart from the frequency band used for communication with the electronic device 101. For example, the external electronic device 211 may use, for communication with the electronic device 101, an additional frequency band (e.g., 6.020 to 6.100 GHz, or 6.100 to 6.180 GHz) in addition to a frequency band (e.g., 5.940 to 6.020 GHz) used for communication with the electronic device 101.

In an embodiment, the external electronic device 211 may transmit information on a changed frequency band to the electronic device 101. In an embodiment, the electronic device 101 and the external electronic device 211 may transmit/receive a signal, based on the changed frequency band.

Figure 5:
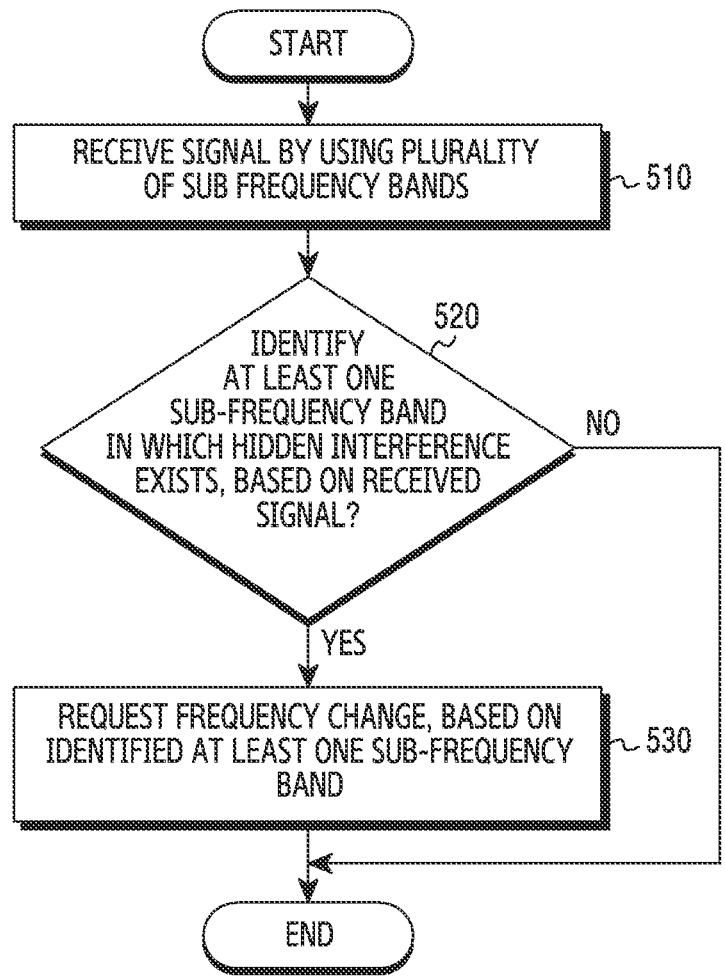
FIG. 5 is a flowchart illustrating an operation of an electronic device according to an embodiment of the disclosure.

FIG. 5 is a flowchart illustrating an operation of an electronic device (e.g., an electronic device of FIG. 1) according to an embodiment of the disclosure. FIG. 5 may be described with reference to FIGS. 1 to 4.

The operations of FIG. 5 may be repeatedly performed by the electronic device 101 at a specified signal reception time of the electronic device 101 or periodically (e.g., at a specified time interval).

Referring to FIG. 5, in operation 510, a processor 120 of an electronic device 101 may receive a signal by using a plurality of sub-frequency bands 410, 430, 450, or 470, through a wireless communication module 192. In an embodiment, the processor 120 may receive a signal from the external electronic device 211 by using the plurality of sub-frequency bands 410, 430, 450, or 470, based on a specified RAT (e.g., a RAT based on the IEEE 802.11ax standard). In an embodiment, the plurality of sub-frequency bands 410, 430, 450, or 470 may be sub-frequency bands included in a frequency band allocated to a wireless communication channel between the external electronic device 211 and the electronic device 101. In an embodiment, each of the sub-frequency bands 410, 430, 450, or 470 may have a specified bandwidth (e.g., 20 MHz).

In operation 520, the processor 120 may identify at least one sub-frequency band in which hidden interference exists, based on the received signal.

In an embodiment, when information included in a specified field of a signal received through at least one of the plurality of sub-frequency bands 410, 430, 450, or 470 includes specified information, the processor 120 may identify at least one sub-frequency band in which hidden interference exists among the sub-frequency bands 410, 430, 450, or 470. In an embodiment, the specified information may include identification information (e.g., a BSS color) of a BSS related to the external electronic device 211, and a link indicator indicating a downlink.

In an embodiment, when the information included in the specified field of the signal received through the at least one sub-frequency band includes the specified information, the processor 120 may identify at least one sub-frequency band receiving a signal not including the specified information among the plurality of sub-frequency bands 410, 430, 450, or 470, as a sub-frequency band in which hidden interference exists. In an embodiment, when the information included in the specified field of the signal received through the at least one sub-frequency band includes the specified information, the processor 120 may identify at least one sub-frequency band in which the HE-SIG-A field 350 does not include the specified information among the plurality of sub-frequency bands 410, 430, 450, or 470, as a sub-frequency band in which hidden interference exists.

In operation 520, in response to identifying the at least one sub-frequency band in which the hidden interference exists based on the received signal (determining 'Yes'), the processor 120 may perform operation 530. In response to identifying in operation 520 that the hidden interference does not exist based on the received signal (determining No'), the processor 120 may end the operation of FIG. 5.

In operation 530, the processor 120 may request a frequency change, based on the identified at least one sub-frequency band. In an embodiment, the processor 120 may request a change of a frequency band allocated to the wireless communication channel, by transmitting a signal including information on the at least one sub-frequency band (e.g., the sub-frequency band 410) in which the hidden interference exists to the external electronic device 211.

In an embodiment, a packet including the information on the at least one sub-frequency band (e.g., the sub-frequency band 410) in which the hidden interference exists may be a packet including a TWT element. In an embodiment, the packet including the information on the at least one sub-frequency band (e.g., the sub-frequency band 410) in which the hidden interference exists may be a packet of a format for indicating a bandwidth query report (BQR).

In an embodiment, the external electronic device 211 may change the frequency band, by setting not to use the sub-frequency band (e.g., the sub-frequency band 410) in which the hidden interference exists, for communication with the electronic device 101, based on the information on the at least one sub-frequency band (e.g., the sub-frequency band 410) in which the hidden interference exists.

In an embodiment, in response to the frequency change request, the external electronic device 211 may change the frequency band, by again setting a frequency band used for communication with the electronic device 101. In an embodiment, the external electronic device 211 may change the frequency band, by setting a frequency band distinguished from the sub-frequency band in which the hidden interference exists, as a frequency band used for communication with the electronic device 101, based on the information on the at least one sub-frequency band (e.g., the sub-frequency band 410) in which the hidden interference exists.

In an embodiment, in response to the frequency change request, the external electronic device 211 may change the frequency band, by additionally setting a frequency band used for communication with the electronic device 101. In an embodiment, in response to the frequency change request, the external electronic device 211 may change the frequency band, by setting a sub-frequency band not allocated to a wireless communication channel with the electronic device 101, as the frequency band used for communication with the electronic device 101.

In an embodiment, the external electronic device 211 may transmit information on the changed frequency band to the electronic device 101. In an embodiment, the external electronic device 211 may transmit the information on the changed frequency band to the electronic device 101 by using a specified format (e.g., an HE operation element). In an embodiment, the electronic device 101 and the external electronic device 211 may transmit/receive signals, based on the changed frequency band.

Figure 6:
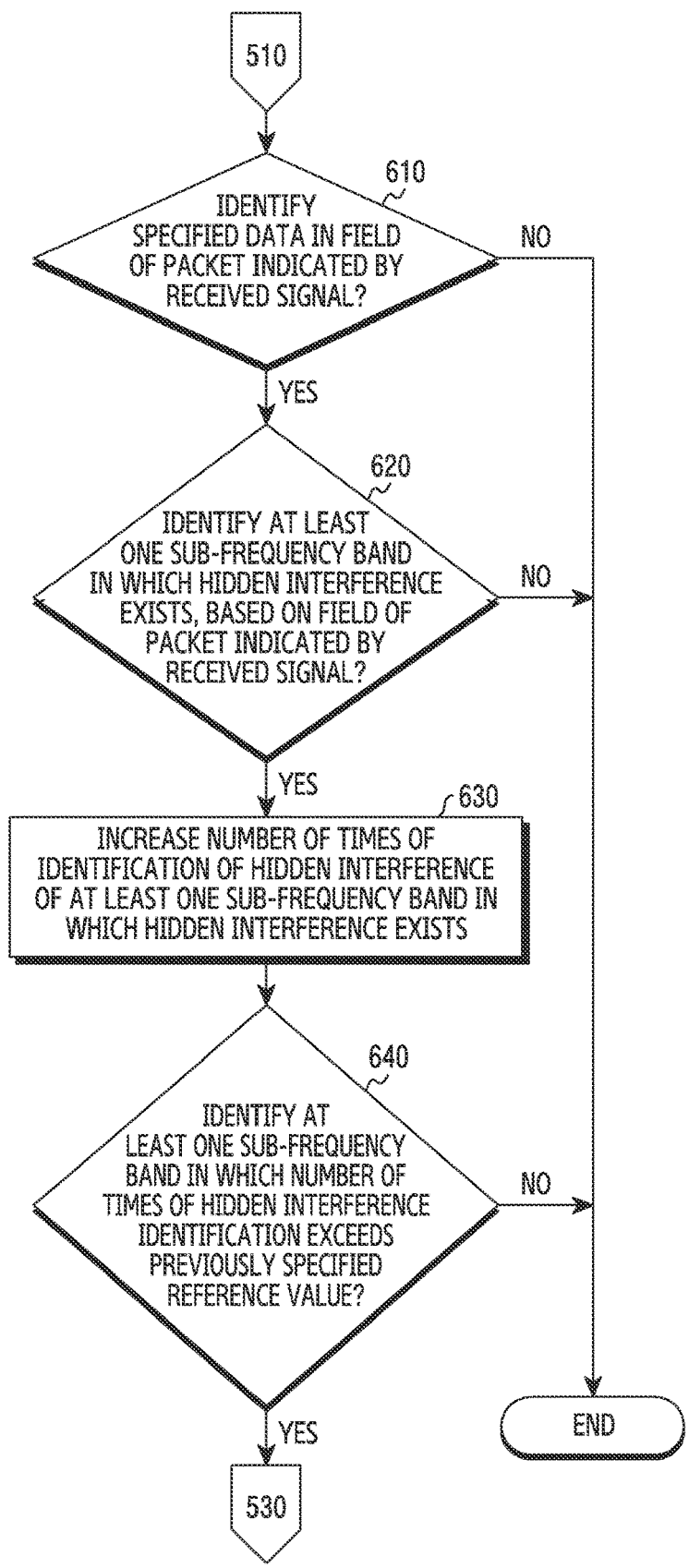
FIG. 6 is a flowchart illustrating an operation of identifying hidden interference in an electronic device according to an embodiment of the disclosure.

FIG. 6 is a flowchart illustrating an operation of identifying hidden interference in an electronic device (e.g., an electronic device 101 of FIG. 1) according to an embodiment of the disclosure. The operations of FIG. 6 may be included in operation 520 of FIG. 5. FIG. 6 may be described with reference to FIGS. 1 to 4.

Referring to FIG. 6, in operation 610, the processor 120 of the electronic device 101 may identify specified data in a specified field of a received signal. In an embodiment, the processor 120 may identify the specified data in a specified field of a signal received through at least one of the plurality of sub-frequency bands 410, 430, 450, or 470. In an embodiment, the field in which the processor 120 identifies the specified data may be the HE-SIG-A field 350. In an embodiment, the specified data may include identification information (e.g., a BSS color) of a BSS related to the external electronic device 211, and a link indicator indicating a downlink.

In response to identifying the specified data in the specified field of the received signal (determining 'Yes') in operation 610, the processor 120 may perform operation 620. In response to identifying that the specified data is not identified in the specified field of the received signal (determining 'No') in operation 610, the processor 120 may end the operation of FIG. 6.

In operation 620, the processor 120 may identify at least one sub-frequency band in which hidden interference exists, based on the received signal.

In an embodiment, the processor 120 may identify a sub-frequency band receiving the HE-SIG-A field 350 in which the identification information (e.g., the BSS color) of the BSS related to the external electronic device 211 is not identified, as a sub-frequency band in which hidden interference exists. In an embodiment, the processor 120 may identify a sub-frequency band in which the HE-SIG-A field 350 in which the indicator indicating the downlink is not identified, as a sub-frequency band in which hidden interference exists.

In response to identifying the at least one sub-frequency band in which the hidden interference exists (determining 'Yes') in operation 620, the processor 120 may perform operation 630. In response to identifying in operation 620 that the at least one sub-frequency band in which the hidden interference exists is not identified (determining No'), the processor 120 may end the operation of FIG. 6. In an embodiment, when the operation of FIG. 6 is ended, the processor 120 may again perform the operation of FIG. 5 in a next cycle (e.g., a next signal reception time).

In operation 630, the processor 120 may increase the number of identification of hidden interference of the at least one sub-frequency band in which the hidden interference exists. In an embodiment, the processor 120 may increase, by one, the number of hidden interference identification of at least one sub-frequency band in which the hidden interference exists.

In an embodiment, the processor 120 may increase the number of hidden interference identification in each of the at least one sub-frequency band in which the hidden interference exists among at least one sub-frequency band 410, 430, 450, or 470 included in an allocated frequency band. In an embodiment, the processor 120 may count the number of times of identifying hidden interference per specified unit time (e.g., 1 second) in each of the at least one sub-frequency band 410, 430, 450, or 470 included in the allocated frequency band, by increasing the number of hidden interference identification in each of the at least one sub-frequency band. For example, the processor 120 may count the number of hidden interference identification in each of the at least one sub-frequency band in which the hidden interference exists, based on a received signal, during a specified time, and may perform operation 640 when the specified time is ended.

In operation 640, the processor 120 may identify at least one sub-frequency band in which the number of hidden interference identification exceeds a specified reference value. In an embodiment, the specified reference value may correspond to a specified threshold number of times. In an embodiment, the specified reference value may be set differently for each application 146 (or a function presented by the application 146) of the electronic device 101 that is being executed. In an embodiment, when the application 146 transmits/receives data to and from the external electronic device 211 through VoIP, the reference value may be 5 times per second. In an embodiment, when the application 146 is under video streaming, the reference value may be 10 times per second. In an embodiment, when the application 146 is under web browsing, the reference value may be 20 times per second.

In an embodiment, the processor 120 may identify at least one sub-frequency band (e.g., the sub-frequency band 410) in which the number of hidden interference identification exceeds a reference value that is specified for the application 146 (or a function presented by the application 146) of the electronic device 101 that is being executed.

In an embodiment, when counting the number of hidden interference identification, the processor 120 may count separately based on each sub-frequency band, or may count based on whether hidden interference has occurred in at least one sub-frequency band, or may count based on a sum of sub-frequency bands in which hidden interference occurs.

When the at least one sub-frequency band in which the number of hidden interference identification exceeds the specified reference value is determined (determining 'Yes') in operation 640, the processor 120 may perform operation 530. When the at least one sub-frequency band in which the number of hidden interference identification exceeds the specified reference value is not identified (determining 'No') in operation 640, the processor 120 may end the operation of FIG. 6.

When performing operation 530 after operation 640, the processor 120 may request a frequency change, by transmitting a signal including information on the identified at least one sub-frequency band. In an embodiment, the processor 120 may request a change of a frequency allocated to a wireless communication channel, by transmitting the signal including the information on the identified at least one sub-frequency band (e.g., the sub-frequency band 410) to the external electronic device 211.

In an embodiment, the signal including the information on the determined at least one sub-frequency band (e.g., the sub-frequency band 410) may be a signal indicating a packet including a TWT element, or a signal indicating a BQR.

In an embodiment, the external electronic device 211 may change a frequency band allocated to a wireless communication channel with the electronic device 101, based on a signal received from the electronic device 101.

In an embodiment, the external electronic device 211 may change the frequency band, by again setting a frequency band used for communication with the electronic device 101. In an embodiment, the external electronic device 211 may change the frequency band, by setting a frequency band distinguished from the sub-frequency band in which the hidden interference exists, as the frequency band used for communication with the electronic device 101.

In an embodiment, the external electronic device 211 may change the frequency band, by additionally setting the frequency band used for communication with the electronic device 101. In an embodiment, the external electronic device 211 may change the frequency band, by setting a sub-frequency band not allocated to the wireless communication channel with the electronic device 101, as the frequency band used for communication with the electronic device 101.

In an embodiment, the external electronic device 211 may transmit information on the changed frequency band to the electronic device 101. In an embodiment, the external electronic device 211 may transmit the information on the changed frequency band to the electronic device 101, by using a specified format (e.g., an HE operation element). The external electronic device 211 may transmit information on a field indicating a channel number of the changed frequency band, and a field indicating a center frequency, to the electronic device 101, by using the specified format (e.g., the HE operation element). In an embodiment, the electronic device 101 and the external electronic device 211 may transmit/receive signals, based on the changed frequency band.

In an embodiment, when the operation of FIG. 6 is ended, the processor 120 may again perform the operation of FIG. 5 periodically (e.g., a next signal reception time or a specified time interval).

The electronic device 101 of an embodiment described above may include the wireless communication module 192, the processor 120 operatively connected to the wireless communication module 192, and the memory 130 operatively connected to the processor 120. The memory 130 may include instructions that, when executed, cause the processor 120 to receive a first signal by using the plurality of sub-frequency bands 410, 430, 450 or 470 through the wireless communication module 192, identify at least one sub-frequency band in which hidden interference is identified, based on the pre-high efficiency (pre-HE) modulated field 301 of a packet indicated by the first signal, and change a communication frequency, by transmitting a second signal including information indicating the identified at least one sub-frequency band to the external electronic device 211 in which a wireless communication connection has been established.

In an embodiment, the instructions may, when executed, cause the processor 120 to identify first information and second information included in the pre-HE modulated field, identify whether the first information indicates identification information of a basic service set (BSS) related to the external electronic device 211, identify whether the second information indicates that the packet is a downlink packet, and, in response to identifying that the first information indicates the identification information of the BSS related to the external electronic device 211, and the second information indicates that the packet is a downlink packet, identify the at least one sub-frequency band in which the hidden interference exists.

In an embodiment, the instructions may, when executed, cause the processor 120 to identify the first information and the second information in a high-efficiency signal A (HE-SIG A) field among the pre-HE modulated field.

In an embodiment, the instructions may, when executed, cause the processor 120 to identify a sub-frequency band in which information included in the pre-HE modulated field is not identified among the plurality of sub-frequency bands, as the at least one sub-frequency band in which the hidden interference exists.

In an embodiment, the identification information of the BSS related to the access point (e.g., the external electronic device 211) is a BSS color.

In an embodiment, the instructions may, when executed, cause the processor 120 to count the number of times of identifying hidden interference of each of the plurality of sub-frequency bands, based on the pre-HE modulated field of the packet indicated by the first signal received at every specified reception time, and transmit the second signal to the access point (e.g., the external electronic device 211), based on the number of times of identifying hidden interference in each of the plurality of sub-frequency bands.

In an embodiment, the instructions may, when executed, cause the processor 120 to transmit the second signal to the external electronic device 211, based on identifying that the number of times of identifying hidden interference exceeds a specified threshold number of times.

In an embodiment, the specified threshold number of times may be set based on an application that is currently transmitting and/or receiving data with the external electronic device 211.

In an embodiment, the second signal may be a packet including a target wake time (TWT) element.

In an embodiment, the information indicating the identified at least one sub-frequency band may be included in a TWT channel field of the packet of the TWT format.

In an embodiment, the second signal may be a packet of a format for indicating a bandwidth query report (BQR).

In an embodiment, the second signal may be transmitted in response to receiving a bandwidth query report poll (BQRP) from the access point.

A method of operating the electronic device 101 of an embodiment described above may include receiving a first signal by using the plurality of sub-frequency bands 410, 430, 450, or 470, through the wireless communication module 192 of the electronic device 101, identifying at least one sub-frequency band in which hidden interference is identified, based on a pre-high efficiency (pre-HE) modulated field of a packet indicated by the first signal, and changing a communication frequency, by transmitting a second signal including information indicating the identified at least one sub-frequency band to the external electronic device 211 in which a wireless communication connection has been established.

In an embodiment, identifying the at least one sub-frequency band may include identifying first information and second information included in the pre-HE modulated field, identifying whether the first information indicates identification information of a basic service set (BSS) related to the external electronic device 211, identifying whether the second information indicates that the packet is a downlink packet, and, in response to identifying that the first information indicates the identification information of the BSS related to the external electronic device 211 and the second information indicates that the packet is a downlink packet, identifying the at least one sub-frequency band in which the hidden interference exists.

In an embodiment, identifying the first information and the second information may include identifying the first information and the second information in a high-efficiency signal A (HE-SIG A) field among the pre-HE modulated field.

In an embodiment, identifying the at least one sub-frequency band in which the hidden interference exists may include identifying a sub-frequency band in which the pre-HE modulated field is not identified among the plurality of sub-frequency bands, as the at least one sub-frequency band in which the hidden interference exists.

In an embodiment, changing the communication frequency may include counting the number of times of identifying hidden interference of each of the plurality of sub-frequency bands, based on the pre-HE modulated field of the packet indicated by the first signal received at every specified reception time, and transmitting the second signal to the external electronic device 211, based on the number of times of identifying hidden interference in each of the plurality of sub-frequency bands.

In an embodiment, transmitting the second signal to the external electronic device 211 may include transmitting the second signal to the external electronic device 211, based on identifying that the number of times of identifying hidden interference exceeds a specified threshold number of times.

In an embodiment, the second signal may be a packet of a target wake time (TWT) format.

In an embodiment, the second signal may be a packet of a format for indicating a bandwidth query report (BQR).

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a communication circuit;
   at least one processor electrically connected to the communication circuit; and
   memory storing instructions that, when executed by the at least one processor individually or collectively, cause the electronic device to:
   receive, from an external electronic device, first data using a plurality of sub-frequency bands of a frequency band via the communication circuit,
   identify at least one sub-frequency band in which an interference occurs among the plurality of sub-frequency bands, based on whether first information on a basic service set (BSS) of the external electronic device is included in the first data, and
   transmit, to the external electronic device, second data including information related to at least a portion of the plurality of sub-frequency bands,
   wherein the at least one sub-frequency band is set not to be used for a wireless communication with the external electronic device based on the second data.

2. The electronic device of claim 1, wherein the instructions, when executed by the at least one processor, further cause the electronic device to:
   identify whether the first information and second information are included in a pre-high efficiency (pre-HE) modulated field of the first data, wherein the second information indicates the first data is downlink data, and
   in case that the first information and the second information are not included in the first data, identify that the interference exists in a sub-frequency band in which the first data is received.

3. The electronic device of claim 2, wherein the instructions, when executed by the at least one processor, further cause the electronic device to:
   identify the first information and the second information in a high-efficiency signal A (HE-SIG A) field of the pre-HE modulated field.

4. The electronic device of claim 2, wherein the instructions, when executed by the at least one processor, further cause the electronic device to:
   identify a sub-frequency band in which information comprised in the pre-HE modulated field is not identified among the plurality of sub-frequency bands, as the at least one sub-frequency band in which the interference exists.

5. The electronic device of claim 2,
   wherein the first information includes identification information of the BSS of the external electronic device, and
   wherein the identification information includes a BSS color of the external electronic device.

6. The electronic device of claim 1,
   wherein the instructions, when executed by the at least one processor, further cause the electronic device to:
   count a number of times in which the interference occurs in each of the plurality of sub-frequency bands, based on the first data received at every specified time, and
   transmit, to the external electronic device, the second data based on the number of times, and
   wherein the information related to the at least a portion of the plurality of sub-frequency bands indicates the at least one sub-frequency band in which the interference occurs.

7. The electronic device of claim 6, wherein the instructions, when executed by the at least one processor, further cause the electronic device to:
   transmit the second data to the external electronic device, in case that the number of times exceeds a threshold.

8. The electronic device of claim 7, wherein the threshold is set based on an application that is currently transmitting or receiving data with the external electronic device.

9. The electronic device of claim 1, wherein the second data is a packet comprising a target wake time (TWT) element.

10. The electronic device of claim 9, wherein the information related to the at least a portion of the plurality of sub-frequency bands is comprised in a TWT channel field of a packet comprising the TWT element.

11. The electronic device of claim 1, wherein the second data is a packet of a format for indicating a bandwidth query report (BQR).

12. The electronic device of claim 11, wherein the second data is transmitted in response to receiving a bandwidth query report poll (BQRP) from the external electronic device.

13. A method performed by an electronic device, method comprising:
receiving, from an external electronic device, first data using a plurality of sub-frequency bands of a frequency band, via a communication circuit of the electronic device;
identifying at least one sub-frequency band in which an interference occurs among the plurality of sub-frequency bands, based on whether first information on a basic service set (BSS) of the external electronic device is included in the first data; and
transmitting, to the external electronic device, second data including information related to at least a portion of the plurality of sub-frequency bands,
wherein the at least one sub-frequency band is set not to be used for a wireless communication with the external electronic device based on the second data.

14. The method of claim 13, further comprising:
identifying whether the first information and second information are included in a pre-high efficiency (pre-HE) modulated field of the first data, wherein the second information indicates the first data is downlink data; and
in case that the first information and the second information are not included in the first data, identifying that the interference exists in a sub-frequency band in which the first data is received.

15. The method of claim 13, further comprising:
counting a number of times in which the interference occurs in each of the plurality of sub-frequency bands, based on the first data received at every specified time; and
transmitting, to the external electronic device, the second data based on the number of times,
wherein the information related to the at least a portion of the plurality of sub-frequency bands indicates the at least one sub-frequency band in which the interference occurs.

16. The method of claim 15, further comprising:
determining that the number of times exceeds a threshold.

17. The method of claim 16, wherein the threshold is set differently for different applications.

18. The method of claim 17, wherein the specified threshold-for voice over Internet protocol (VOIP) is 5 times per second, the specified threshold for video streaming is 10 times per second, and the specified-threshold for web browsing is 20 times per second.

19. The method of claim 13, wherein the second data is a packet of a format for indicating a bandwidth query report (BQR).

20. The method of claim 13, wherein the second data is transmitted in response to receiving a bandwidth query report poll (BQRP) from the external electronic device.

* * * * *